United States Patent [19]

Sano et al.

[11] Patent Number: 4,904,743
[45] Date of Patent: Feb. 27, 1990

[54] FLUORINATED ETHYLENE/ALPHA-OLEFIN COPOLYMERS

[75] Inventors: Akira Sano, Kawasaki; Motohiko Yoshizumi, Saitama; Nobuya Takenuki, Omiya; Kazuo Matsuura, Tokyo, all of Japan

[73] Assignees: Nippon Oil Company, Limited; Mitsubishi Metal Corporation, both of Japan

[21] Appl. No.: 235,001

[22] Filed: Aug. 22, 1988

[30] Foreign Application Priority Data

Aug. 20, 1987 [JP] Japan .................................. 62-205154

[51] Int. Cl.$^4$ ................................................ C08F 8/22
[52] U.S. Cl. .................................. 525/334.1; 525/356
[58] Field of Search ....................................... 525/334.1

[56] References Cited

U.S. PATENT DOCUMENTS

| | | | |
|---|---|---|---|
| 3,758,450 | 9/1973 | Margrave et al. | 525/334.1 |
| 4,142,032 | 2/1979 | D'Angelo | 525/334.1 |
| 4,484,954 | 11/1984 | Tarancon | 525/334.1 |
| 4,536,266 | 8/1985 | Bliefert et al. | 525/334.1 |
| 4,703,066 | 10/1987 | Nakagawa | 525/334.1 |

OTHER PUBLICATIONS

"Surface Treatment of Polymers", Schonhorn and Hansen, Journal of Appl. Poly. Sci., vol. 12, pp. 1231–1237, 1968.

*Primary Examiner*—Joseph L. Schofer
*Assistant Examiner*—Bernard Lipman
*Attorney, Agent, or Firm*—Scully, Scott, Murphy & Presser

[57] ABSTRACT

A modified olefinic polymer is obtained by fluorinating an ethylene/α-olefin copolymer having the following properties (i) to (iv), said ethylene/α-olefin copolymer being prepared by copolymerizing ethylene and an α-olefin having 3 to 12 carbon atoms in the presence of a catalyst comprising a solid catalyst component and an organoaluminum compound, said solid catalyst component containing at least magnesium and titanium:

(i) Melt index: 0.01–100 g/10 min
(ii) Density: 0.860–0.910 g.cm$^3$
(iii) Maximum peak temperature (Tm) as measured according to a differential scanning calorimetry (DSC) should be not lower than 100° C.
(iv) Insolubles in boiling n-hexane should be not less than 10% by weight.

7 Claims, No Drawings

FLUORINATED ETHYLENE/ALPHA-OLEFIN COPOLYMERS

BACKGROUND OF THE INVENTION

The present invention relates to modified olefinic polymers superior in water- and oil-repellency. More particularly, it is concerned with modified ethylene/α-olefin copolymers obtained by fluorinating ethylene/α-olefin copolymers having specific properties.

Fluorinated polyethylenes have heretofore been produced with a view to improving water- and oil-repellency, using mainly high density polyethylenes obtained by medium and low pressure processes or low density polyethylenes obtained by a high pressure process. However, the fluorinated polyethylenes obtained from those starting materials are still not satisfactory in point of water- and oil-repellency.

In order to further enhance the performance of the fluorinated product obtained it is necessary to adopt severer conditions of fluorination. In many cases, however, this results in undesirable side reactions such as change in quality, deterioration or decomposition of the starting polyethylene.

Under such circumstances it has been desired to develop a novel fluorinated polymer obtained under milder fluorination conditions and superior in water- and oil-repellency.

SUMMARY OF THE INVENTION

Accordingly, it is the object of the present invention to provide novel fluorinated polymers obtained under mild fluorination conditions and superior in water-and oil-repellency.

Having made extensive studies for achieving the above-mentioned object, the present inventors surprisingly found that by fluorinating ethylene/α-olefin copolymers having the following specific properties there could be obtained novel fluorinated ethylene/α-olefin copolymers remarkably superior in water- and oil-repellency as compared with known fluorinated polyethylenes using high or low density polyethylenes. In this way we reached the present invention.

More specifically, the present invention concerns modified ethylene/α-olefin copolymers obtained by fluorinating ethylene/α-olefin copolymers having the following properties (i) to (iv), the ethylene/α-olefin copolymers being obtained by copolymerizing ethylene with -olefins of $C_3$ to $C_{12}$ in the presence of a catalyst consisting essentially of a solid catalyst component and an organoaluminum compound which solid catalyst component contains at least magnesium and titanium:

(i) Melt index: 0.01 –100 g/10 min.
(ii) Density: 0.860 –0.910 $g/cm^3$.
(iii) Maximum peak temperature (Tm) as measured according to a differential scanning calorimetry (DSC) should be not lower than 100° C.
(iv) Insolubles in boiling n-hexane should be not less than 10 wt.%. The fluorinated ethylene/α-olefin copolymers of the present invention are remarkably superior in water- and oil-repellency and also superior in fluidity, strength, heat resistance, slidability and chemicals resistance.

DETAILED DESCRIPTION OF THE INVENTION

The present invention will be described in detail hereinunder.

(1) Preparation of Ethylene/α-Olefin Copolymer

The ethylene/α-olefin copolymer used in the present invention is prepared by copolymerizing ethylene and an α-olefin in the presence of a catalyst comprising a solid catalyst component and an organoaluminum compound which solid catalyst component contains at least magnesium and titanium. The α-olefin to be copolymerized with ethylene is one having 3 to 12, preferably 3 to 6, carbon atoms. Examples are propylene, butene-1, 4-methylpentene-1, hexene-1, octene-1, decene-1 and dodecene-1. Particularly preferred are propylene, butene-1, 4-methylpentene-1 and hexene-1 which have 3 to 6 carbon atoms. Dienes may be used as additional comonomers. Examples are butadiene, 1,4-hexadiene, vinyl norbornene and ethylidene norbornene. It is preferable that the α-olefin content in the ethylene/α-olefin copolymer be in the range to 5 to 40 mol%, especially 8 to 30 mol%.

The catalyst system used comprises a solid catalyst component and an organoaluminum compound the solid catalyst component containing at least magnesium and titanium. For example, the solid catalyst component is obtained by supporting a titanium compound on an inorganic solid compound containing magnesium by a known method. Examples of magnesium-containing inorganic solid compounds include, in addition to metal magnesium, magnesium hydroxide, magnesium carbonate, magnesium oxide, magnesium chloride, as well as double salts, double oxides, carbonates, chlorides and hydroxides, which contain magnesium atom and a metal selected from silicon, aluminum and calcium further, these inorganic solid compounds after treatment or reaction with oxygencontaining compounds, sulfur-containing compounds, aromatic hydrocarbons or halogen-containing substances.

As examples of the above oxygen-containing compounds are mentioned water and organic oxygen-containing compounds such as alcohols, phenols, ketones, aldehydes, carboxylic acids, esters, polysiloxanes and acid amides, as well as inorganic oxygen-containing compounds such as metal alkoxides and metal oxychlorides. As examples of the above sulfur-containing compounds are mentioned organic sulfur-containing compounds such as thiols, thioethers and the like, and inorganic sulfur-containing compounds such as sulfur dioxide, sulfur trioxide, sulfuric acid and the like. As examples of the above aromatic hydrocarbons are mentioned mono- and polycyclic aromatic hydrocarbons such as benzene, toluene, xylene, anthracene and phenanthrene. As examples of the above halogen-containing compounds are mentioned chlorine, hydrogen chloride, metal chlorides and organic halides.

To illustrate the titanium compound, mention may be made of halides, alkoxyhalides, alkoxides and halogenated oxides, of titanium. Tetravalent and trivalent titanium compounds are preferred. As tetravalent titanium compounds are preferred those represented by the general formula $Ti(OR)_nX_{4-n}$ wherein R is an alkyl, aryl or aralkyl group having 1 to 20 carbon atoms, X is a halogen atom and n is $0 \leq n \leq 4$, such as, for example, titanium tetrachloride, titanium tetrabromide, titanium tetraiodide, monomethoxytrichlorotitanium, dimethoxydichlorotitanium, triethoxymonochlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, triisopropoxymonochlorotitanium, tetraisopropoxytitanium, monobutoxytrichlorotitanium, dibutoxydichlorotitanium, monopentoxytrichlorotitanium, monophenoxytrichlorotitanium, diphenoxydichlorotitanium, triphenoxymonochlorotitanium and tetraphenoxytitanium. As examples of trivalent titanium compounds are mentioned titanium trihalides such as titanium tetrachloride and tatninum tetrabromide reduced with hydrogen, aluminum, titanium or an organometallic compound of a Group I-III metal in the Periodic Table, as well as trivalent titanium compounds obtained by reducing tetravalent alkoxytitanium halides of the general formula $Ti(OR)_mX_{4-m}$ with an organometallic compound of a Group I-III metal in the Periodic Table in which formula R is an alkyl, aryl or aralkyl group having 1 to 20 carbon atoms, X is a halogen atom and m is $0 < m < 4$. Tetravalent titanium compounds are particularly preferred.

As preferred examples of catalyst systems are mentioned combinations of organoaluminum compounds with such solid catalyst components as $MgO$—RX—$TiCl_4$ (Japanese Patent Publication No. 3514—1976), Mg—$SiCl_4$—ROH—$TiCl_4$ (Japanese Patent Publication No. 23864/1975), $MgCl_2$ —$Al(OR)_3$ —$TiCl_4$ (Japanese Patent Publication Nos. 152/1976 and 15111/1977), $MgCl_2$—$SiCl_4$—ROH—$TiCl_4$ (Japanese Patent Laid Open No. 106581/1974), $Mg(OOCR)_2$—$Al(OR)_3$—$TiCl_4$ (Japanese Patent Publication No. 11710/1977), Mg—$POCl_3$—$TiCl_4$ (Japanese Patent Publication No. 153/1976), $MgCl_2$—$AlOCl$—$TiCl_4$ (Japanese Patent Publication No. 15316/1979) and $MgCl_2$—$Al(OR)_n$—$Si(OR')_mX_{4-m}$—$TiCl_4$ (Japanese Patent Laid Open No. 95909/1981), in which formulae R and R' are each an organic radical and X is a halogen atom.

As other examples of catalyst systems are mentioned combinations of organoaluminum compounds with reaction products as solid catalyst components obtained by the reaction of organomagnesium compounds such as so-called Grignard compounds with titanium compounds. Examples of organomagnesium compounds are those of the general formulae RMgX, $R_2Mg$ and RMg(OR) wherein R is an organic radical having 1 to 20 carbon atoms and X is a halogen atom, and ether complexes thereof, as well as modified compounds obtained by modifying these organomagnesium compounds with other organometallic compounds such as, for example, organosodium organolithium, organopotassium, organoboron, organocalcium and organozinc.

More concrete examples of such catalyst systems are combinations of organoaluminum compounds with such solid catalyst components as RMgX—$TiCl_4$ (Japanese Patent Publication No. 39470/1975), RMgX—phenol—$TiCl_4$ (Japanese Patent Publication No. 12953/1979), RMgX-halogenated phenol-$TiCl_4$ (Japanese Patent Publication No. 12954/1979) and RMgX—$CO_2$ —$TiCl_4$ (Japanese Patent Laid Open No. 73009/1982). As still other examples of catalyst systems are mentioned combinations of organoaluminum compounds with solid products obtained by contacting such inorganic oxides as $SiO_2$ and $Al_2O_3$ with the solid catalyst component containing at least magnesium and titanium. In addition to $SiO_2$ and $Al_2O_3$ there also may be mentioned CaO, $B_2O_3$ and $SnO_2$ as examples of inorganic oxides. Double oxides thereof are also employable without any trouble. For contacting these inorganic oxides with the solid catalyst component containing magnesium and titanium, there may be adopted a known method. For example, both may be reacted at a temperature of 20° C. to 400° C., preferably 50° C. to 300° C., usually for 5 minutes to 20 hours, in the presence or absence of an inert solvent, or both may be subjected to a co-pulverization treatment, or there may be adopted a suitable combination of these methods.

As more concrete examples of such catalyst systems, mention may be made of combination of organoaluminum compounds with $SiO_2$—ROH—$MgCl_2$—$TiCl_4$ (Japanese Patent Laid Open No. 47407/1981), $SiO_2$—R—O—R'—MgO—$AlCl_3$—$TiCl_4$ (Japanese Patent Laid Open No. 187305/1982) and $SiO_2$—$MgCl_2$—$Al(OR)_3$—$TiCl_4$—$Si(OR')_4$ (Japanese Patent Laid Open No. 21405/1983) in which formulae R and R' are each a hydrocarbon radical.

In these catalyst systems the titanium compounds may be used as adducts with organocarboxylic acid esters, and the magnesium-containing inorganic solid compounds may be used after contact treatment with organic carboxylic acid esters. Moreover, the organoaluminum compounds may be used as adducts with organocarboxylic acid esters. Further, the catalyst systems may be prepared in the presence of organic carboxylic acid esters.

As organic carboxylic acid esters there may be used various aliphatic, alicyclic and aromatic carboxylic acid esters, preferably aromatic carboxylic acid esters having 7 to 12 carbon atoms. Examples are alkyl esters such as methyl and ethyl of benzoic, anisic and toluic acids.

As preferred examples of the organoaluminum compound to be combined with the solid catalyst component are mentioned those represented by the general formulae $R_3Al$, $R_2AlX$, $RAlX_2$, $R_2AlOR$, $RAl(OR)X$ and $R_3Al_2X_3$ wherein Rs, which may the same or different, are each an alkyl, aryl or aralkyl group having 1 to 20 carbon atoms, such as triethylaluminum, triisobutylaluminum, trihexylaluminum, trioctylaluminum, diethylaluminum chloride, diethylaluminum ethoxide, ethylaluminum sesquichloride, and mixtures thereof.

The amount of the organoaluminum compound used is not specially limited, but usually it is in the range of 0.1 to 1,000 mols per mol of the titanium compound. The catalyst system exemplified above may be contacted with an α-olefin before its used in the polymerization reaction. By so doing, its polymerization activity can be greatly improved and a stabler operation is ensured as compared with the case where it is not so treated. In this case, various α-olefins are employable, but preferably those having 3 to 12 carbon atoms and more preferably those having 3 to 8 carbon atoms. Examples are propylene, butene-1, pentene-1, 4-methylpentene-1, hexene-1, octene-1, decene-1, dodecene-1, and mixtures thereof. The temperature and time of the contact betweenthe catalyst system and α-olefin can be selected over a wide range, for example 0–200° C., preferably 0–110° C., and 1 minute to 24 hours. The amount of the α-olefin to be contacted with the catalyst system can also be selected over a wide range, but usually it is desirable that the catalyst system be treated with 1 g to 50,000 g, preferably 5 g to 30,000 g, per gram of the solid catalyst component of the α-olefin and reacted with 1 g to 500 g per gram of the solid catalyst component of the α-olefin. The pressure in the contact treatment is not specially limited, but preferably it is in the range of −1 to 100 kg/cm².G.

In the α-olefin treatment, the catalyst system may be contacted with the α-olefin after combining the total amount of the organoaluminum compound used with the solid catalyst component, or the catalyst system may be contacted with the α-olefin after combining a part of the organoaluminum compound used with the solid catalyst component and the remaining portion of the organoaluminum compound may be added separately in the polymerization reaction. The contact treatment of the catalyst system with the α-olefin may be conducted in the presence of hydrogen gas or any other inert gas, e.g. nitrogen, argon or helium.

The polymerization reaction is carried out in the same manner as in the conventional olefin polymerization reaction using a Ziegler type catalyst. More particularly, the reaction is performed in a substantially oxygen- and water-free condition in vapor phase or in the presence of an inert solvent or using monomer per se as solvent. Olefin polymerizing conditions involve temperatures in the range of 20° C. to 300° C., preferably 40° C. to 200° C., and pressures in the range from normal pressure to 70 kg/cm².G, preferably 2 kg/cm².G or 60 kg/cm².G. The molecular weight can be adjusted to some extent by changing polymerization conditions such as polymerization temperature and catalyst mol ratio, but the addition of hydrogen into the polymerization system is more effective for this purpose. Of course, two or more multi-stage polymerization reactions involving different polymerization conditions such as different hydrogen concentration and different polymerization temperatures can be carried out without any trouble. Among them, vapor-phase polymerization is preferable.

An ethylene/α-olefin copolymer prepared as above and used in the present invention has a melt index (as measured under the conditions of 190° C., 2.16 kg according to JIS K 6760; hereinafter referred to as "MI") in the range of 0.01 to 100 g/10 min, preferably 0.1 to 50 g/10 min, a density (according to JIS K 6760) in the range of 0.860 to 0.910 g/cm³, preferably 0.870 to 0.905 g/cm³, more preferably 0.880 to 0.900 g/cm³, a maximum peak temperature (Tm) as measured according to differential scanning calorimetry (DSC) of not lower than 100° C., preferably not lower than 110° C., and a boiling n-hexane insolubles content of not less than 10 wt.%, preferably 20 to 95 wt.%, more preferably 30 to 90 wt.%.

An MI of the ethylene/α-olefin copolymer lower than 0.01 g/10 min would result in poor fluidity and an MI thereof exceeding 100 g/10 min would cause deterioration in mechanical strength and thus both such values are undesirable. If the density of the copolymer is lower than 0.860 g/cm³, a modified copolymer obtained by fluorination of the ethylene/α-olefin copolymer will be sticky or low in mechanical strength and thus such density value is not desirable, and a density of the copolymer exceeding 0.910 g/cm³ is not desirable, either, because it would result in poor flexibility and deteriorated low-temperature characteristics. If the maximum peak temperature (Tm) according to DSC is lower than 100° C., the resulting modified copolymer will be sticky or deteriorated in heat resistance and thus such temperature level is not desirable. If the boiling n-hexane insolubles content is smaller than 10 wt.%, the proportion of sticky components will increase and the resulting modified copolymer will also be sticky and deteriorated in mechanical strength, so such insolubles content is not desirable.

In the present invention, insolubles in boiling n-hexane and maximum peak temperature were measured as follows.

[How to Determined Insolubles in Boiling n-Hexane]

A 200 μm thick sheet is formed using a hot press, from which are cut out three sheets each 20 mm long by 30 mm wide. Using these sheets, extraction is made in boiling n-hexane for 5 hours by means of a double-tube type Soxhlet extractor. n-Hexane insolubles are taken out and vacuum-dried (in a vacuum, 50° C., 7 hours) and then the percentage insolubles in boiling n-hexane is calculated in accordance with the following equation:

Insolubles in boiling n-hexane (wt.%) = weight of extracted sheet / weight of unextracted sheet × 100 (wt.%)

[Measurement by DSC]

A specimen of about 5 mg is weighed out from a hot-pressed 100 μm thick film and is set to a DSC apparatus. The temperature is raised to 170° C., at which temperature the specimen is held for 15 minutes, followed by cooling to 0° C. at a cooling rate of 2.5° C./min. From this state, the temperature is raised to 170° C. at a heating rate of 10° C./min and measurement is made. The temperature in the vertex position of the maximum peak of peaks appearing during the heat-up period from 0° C. to 170° C. is regarded as the maximum peak temperature (Tm).

(2) Fluorination of the Ethylene/α-Olefin Copolymer

A modified ethylene/α-olefin copolymer according to the present invention is obtained by fluorinating the ethylene/α-olefin copolymer having the above specific properties. The fluorination may be performed in a known manner. For example, according to a preferred fluorination method, a powder of the ethylene/α-olefin copolymer, or a sheet, film or plate of the copolymer, or a molded article obtained by molding the copolymer by a conventional molding technique, is reacted with fluorine gas or a gaseous mixture of fluorine gas with an inert gas such as nitrogen, helium or argon at a temperature of 0° C. to 120° C., preferably 20° C. to 90° C. According to another method which may be used, a fluorine compound such as ammonium fluoride is blended beforehand with the copolymer and the resulting blend is heated to a temperature at which the fluorine compound will decompose and liberate fluorine, allowing the liberated fluorine to react with the copolymer.

It is desirable that the fluorine content in the thus-fluorinated ethylene/α-olefin copolymer be in the range of about 3 to 80 wt.%, preferably 10 to 80 wt.%, in the surface layer.

Usually the surface layer of the copolymer tends to be higher in fluorine content than the interior thereof, but by increasing the fluorine content in the interior of the copolymer to a level about the same as that in the surface layer of the copolymer through repetition of the foregoing fluorinating operations, it is made possible to obtain a modified copolymer further superior in physical properties such as heat resistance and strength.

The fluorinated ethylene/α-olefin copolymer thus obtained according to the present invention is extremely superior in water- and oil-repellency as compared with conventional products and also superior in fluidity, strength, heat resistance, slidability and resistance to chemicals.

[EXAMPLES]

Examples of the present invention will be described below to illustrate the invention concretely, but the invention is not limited thereto.

EXAMPLE 1

An ethylene/butene-1 copolymer was obtained by copolymerizing ethylene and butene-1 using a catalyst consisting of a solid catalyst component and triethylaluminum which solid catalyst component had been prepared from substantially anhydrous magnesium dichloride, 1,2-dichloroethane and titanium tetrachloride.

The ethylene/butene-1 copolymer was found to have a butene-1 content of 11.4 mol%, a melt index of 0.41 g/10 min, a density of 0.897 g/cm, a maximum peak temperature according to DSC of 120° C. and a boiling n-hexane insolubles content of 87 wt.%.

The ethylene/butene-1 copolymer was subjected to pressing at 180° C., 150 kg/cm$^2$, into a 2 mm thick sheet, which sheet was then fluorinated using a gaseous mixture of fluorine and argon (fluorine/argon volume ratio: 25/75 at 90° C. for 1 hour to obtain a modified ethylene/butene-1 copolymer.

The surface of the modified copolymer was analyzed for fluorine content according X-ray photoelectron spectroscopy (XPS). As a result, the fluorine/carbon mol ratio was found to be 1.2.

Physical properties of the modified copolymer are as shown in Table 1.

EXAMPLE 2

A modified ethylene/butene-1 copolymer was obtained by effecting fluorination in the same manner as in Example 1 except that the composition ratio of the fluorine-argon gaseous mixture was changed to fluorine/argon =40/60 (volume ratio).

The surface of the modified copolymer was analyzed for fluorine content in the same way as in Example 1 to find that the fluorine/carbon mol ratio was 1.4. The results are as shown in Table 1.

EXAMPLE 3

An ethylene/propylene copolymer was obtained by copolymerizing ethylene and propylene using a catalyst consisting of a solid catalyst component and triethylaluminum which solid catalyst component had been prepared from substantially anhydrous magnesium chloride, anthracene and titanium tetrachloride. It was found to have an ethylene content of 88.0 mol% an MI of 1.0 g/10 min, a density of 0.901 g/cm$^3$, a maximum peak temperature according to DSC of 121° C. and a boiling n-hexane insolubles content of 79 wt.%.

This copolymer was fluorinated in the same manner as in Example 1 to obtain a modified ethylene/propylene copolymer. The surface of the modified copolymer was analyzed for fluorine content by the same method as in Example 1 to find that the fluorine/carbon mol ratio was 1.1. The results are as set out in Table 1.

COMPARATIVE EXAMPLE 1

Using a commercially available high-density polyethylene resin (STAFLENE E-750 C, a product of Nippon Petrochemicals Co., Ltd., MI: 5.3 g/10 min, density: 0.963 g/cm$^3$, maximum peak temp. by DSC: 128° C.), fluorination was conducted in the same way as in Example 1. The results are as set out in Table 1.

(COMPARATIVE EXAMPLE 2)

Physical properties of a commercially available Teflon resin (manufactured by Nippon Valqua Industries, Ltd.) are shown in Table 1.

TABLE 1

| Polymer | | Contact angle of water (°) | | Contact angle of liquid paraffin (°) | |
|---|---|---|---|---|---|
| | | untreated | after fluorination | untreated | after fluorination |
| Example 1 | Ethylene/Butene-1 copolymer | 96.1 | 116.4 | 0 | 67.8 |
| Example 2 | Ethylene/Butene-1 copolymer | 96.1 | 118.7 | 0 | 70.6 |
| Example 3 | Ethylene/Propylene copolymer | 92.0 | 113.6 | 0 | 61.1 |
| Comparative Example 1 | High density polyethylene | 89.5 | 93.0 | 0 | 42.0 |
| Comparative Example 2 | Teflon | 101.6 | — | 45.8 | — |

What is claimed is:

1. A modified ethylene/α-olefin copolymer obtained by fluorinating an ethylene/α-olefin copolymer having the following properties (i) to (iv), said ethylene/α-olefin copolymer being prepared by copolymerizing ethylene and an α-olefin having 3 to 12 carbon atoms in the presence of a catalyst comprising a solid catalyst component and an organoaluminum compound, said solid catalyst component containing at least magnesium and titanium:
   (i) Melt index: 0.01 –100 g/10 min
   (ii) Density: 0.860 –0.910 g/cm$^3$
   (iii) Maximum peak temperature (Tm) as measured according to a differential scanning calorimetry (DSC) not lower than 100° C.
   (iv) Insolubles in boiling n-hexane should be not less than 10% by weight.

2. A modified ethylene/α-olefin copolymer as set forth in claim 1, wherein the α-olefin content of said ethylene/α-olefin copolymer is in the range of 5 to 40 mol%.

3. A modified ethylene/α-olefin copolymer as set forth in claim 1, wherein the α-olefin has 3 to 6 carbon atoms.

4. A modified ethylene/α-olefin copolymer as set forth in claim 1, wherein the fluorination is performed using fluorine gas.

5. A modified ethylene/α-olefin copolymer as set forth in claim 1, wherein the fluorination temperature is in the range of 0° C. to 120° C.

6. A modified ethylene/ -olefin copolymer as set forth in claim 1, wherein the ethylene/α-olefin copolymer to be fluorinated is in the form of powder, sheet, film, plate, or a molded article.

7. A modified ethylene/α-olefin copolymer as set forth in claim 6, having a fluorine content of at least the surface thereof in the range of 3 to 80% by weight.

* * * * *